United States Patent
Hurley et al.

(10) Patent No.: US 10,218,719 B2
(45) Date of Patent: Feb. 26, 2019

(54) CREDENTIAL MODIFICATION NOTIFICATIONS

(71) Applicant: Apple Inc., Cupertino, CA (US)

(72) Inventors: Timothy S. Hurley, Los Gatos, CA (US); David E. Brudnicki, Duvall, WA (US); Manoj K. Thulaseedharan Pillai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 15/271,943

(22) Filed: Sep. 21, 2016

(65) Prior Publication Data
US 2018/0083986 A1    Mar. 22, 2018

(51) Int. Cl.
| H04L 29/06 | (2006.01) |
| G06F 17/30 | (2006.01) |
| H04W 12/06 | (2009.01) |
| G06Q 20/36 | (2012.01) |

(52) U.S. Cl.
CPC .... *H04L 63/1416* (2013.01); *G06F 17/30867* (2013.01); *G06Q 20/36* (2013.01); *H04L 63/083* (2013.01); *H04L 63/0861* (2013.01); *H04W 12/06* (2013.01)

(58) Field of Classification Search
CPC .................................................. G06Q 20/36
See application file for complete search history.

(56) References Cited

U.S. PATENT DOCUMENTS

| 7,970,705 | B2* | 6/2011 | Patterson | G06Q 10/06 705/35 |
| 9,119,076 | B1* | 8/2015 | Gubbi | H04W 12/12 |
| 9,420,403 | B1* | 8/2016 | Annan | H04W 4/80 |
| 2009/0125993 | A1* | 5/2009 | Delia | G06F 21/35 726/6 |
| 2009/0222896 | A1* | 9/2009 | Ichikawa | G06F 9/4416 726/6 |
| 2010/0100948 | A1* | 4/2010 | Delia | G06F 21/31 726/6 |
| 2010/0299253 | A1* | 11/2010 | Patterson | G06Q 10/06 705/40 |
| 2010/0299731 | A1* | 11/2010 | Atkinson | G06F 21/42 726/6 |

(Continued)

Primary Examiner — James R Turchen
(74) Attorney, Agent, or Firm — Kilpatrick Townsend & Stockton LLP

(57) ABSTRACT

Disclosed are systems and methods for providing protection against alteration of data, such as a credential, associated with a transaction. A first communication is received from a requesting system. The first communication includes a credential and corresponds to an indication that an extended-duration task is being initiated and a request to listen to a status of the credential. A device-listening data store is updated to associate the credential with an identifier associated with the requesting system. When an event is detected that indicates that the credential has been modified or cancelled, the device-listening data store is queried based on the credential. In response to the query, the identifier associated with the requesting device is received. A second communication is generated that corresponds to an alert that identifies a status of the credential as having been modified or cancelled. The second communication is transmitted to the requesting system.

21 Claims, 4 Drawing Sheets

(56) References Cited

U.S. PATENT DOCUMENTS

| | | | |
|---|---|---|---|
| 2012/0171992 A1* | 7/2012 | Cheong | H04L 63/067 455/410 |
| 2013/0086655 A1* | 4/2013 | Karp | G06F 21/45 726/6 |
| 2013/0160099 A1* | 6/2013 | Fitzpatrick, III | H04L 9/3213 726/7 |
| 2013/0246261 A1* | 9/2013 | Purves | G06Q 20/105 705/41 |
| 2014/0258099 A1* | 9/2014 | Rosano | G06Q 20/409 705/39 |
| 2015/0180894 A1* | 6/2015 | Sadovsky | G06F 3/0481 726/22 |
| 2016/0180302 A1* | 6/2016 | Bagot, Jr. | G06Q 20/027 705/40 |
| 2016/0197914 A1* | 7/2016 | Oberheide | H04L 63/0838 713/183 |
| 2017/0085449 A1* | 3/2017 | Mota | H04L 43/08 |
| 2017/0116585 A1* | 4/2017 | Rosano | G06Q 40/12 |
| 2017/0244730 A1* | 8/2017 | Sancheti | H04L 63/1416 |

* cited by examiner

CREDENTIAL MODIFICATION NOTIFICATIONS

FIELD

The present disclosure relates generally to monitoring credential (or token) status, e.g., to protect against data modifications or destruction, including providing notifications to select systems in response to detecting an event indicating that a credential has been modified, deactivated, or deleted.

BACKGROUND

Despite increasing innovations with respect to security, malicious data actions continue to occur. Data may be modified and/or deleted in unauthorized ways. For example, data may be modified at a time during a workflow that does not accord with a usage control or policy. Such actions can disturb workflows dependent on the data. Thus, improved monitoring and countermeasures are needed to improve data and information security.

SUMMARY

In some embodiments, a system for providing an alert is provided. The system includes one or more data processors. The system can also include a non-transitory computer readable storage medium containing instructions which, when executed by the one or more data processors, can cause the one or more data processors to perform actions. The actions can include receiving, from a requesting system, a first communication identifying a credential associated with a task. The first communication can include a request to monitor a status of the credential. The actions can also include updating a device-listening data store to associate the credential with an identifier associated with the requesting system. The actions can further include monitoring for an event indicating that the credential has been modified or cancelled. The actions can still further include transmitting, upon detecting the event indicating that the credential has been modified or cancelled, an alert to the requesting system, using the identifier associated with the requesting system.

In some embodiments, a computer-implemented method for generating an alert is provided. A request to monitor a credential associated with an extended-duration task can be received from a requesting system. A device-listening data store can be updated to associate the credential with an identifier corresponding to the requesting system. An event indicating that the credential has been altered can be detected. An alert can be transmitted to a destination associated with the requesting system.

In some embodiments, a computer-program product tangibly embodied in a non-transitory machine-readable storage medium is provided. The computer-program product can include instructions configured to cause one or more data processors to perform some or all actions from one or more methods disclosed therein.

The following detailed description together with the accompanying drawings will provide a better understanding of the nature and advantages of the present disclosure.

DETAILED DESCRIPTION

Extended-duration tasks, including transactions, can be performed in reliance on data (e.g., a credential) being available at a later time point during the task duration. However, the extended duration of a task provides time during which the data can be altered, e.g., modified, deactivated, and/or destroyed. The alteration may be a result of malicious action or innocent action. In either circumstance, however, it may not be possible to complete at task as a result of the alteration. For example, alteration of data may impede performance of one or more operations associated with the task and/or may result in undesired resource allocation (e.g., as resources used for the task may have been used to perform other tasks).

In some embodiments, prior to initiation of task performance, a task-managing server transmits a credential and/or task identifier to a credential management server. The credential management server can then associate the credential and/or task identifier with an identifier of the credential management server, which can remain until a request is received to remove the association and/or until the credential management server detects that the task is complete. The credential management server can further monitor for events indicative of an alteration of the credential. If such an event is detected, an alert communication can be transmitted to any task managing server(s) associated with the credential via an association. The task managing server can then initiate a policy to, for example, request a replacement credential and/or disrupt task performance, e.g., by initiating suspension or termination of the task.

Figure 1:
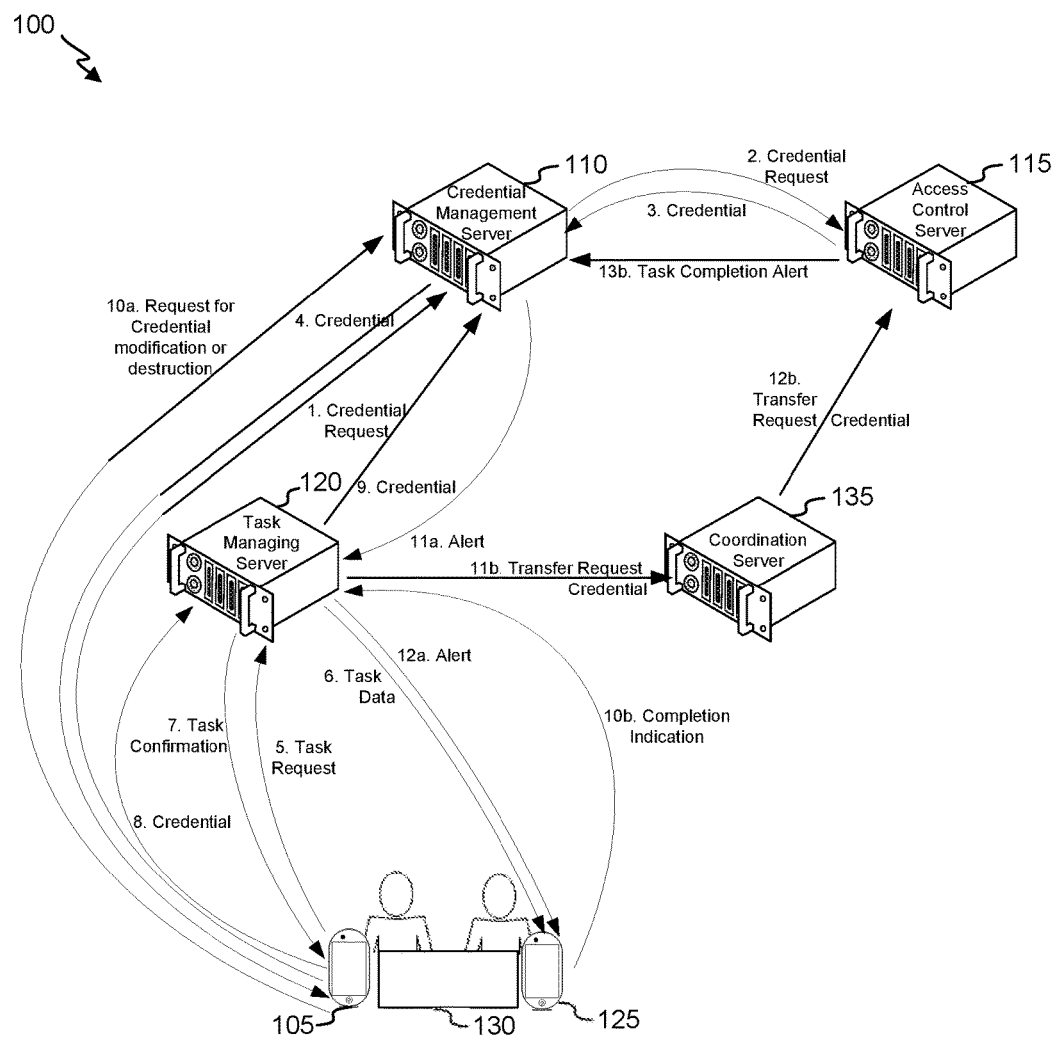
FIG. 1 shows an example of a multi-device network and communication exchange for providing protection against alteration of data.

FIG. 1 shows an example of a multi-device network 100 and communication exchange for providing protection against alteration of data. Network 100 can include multiple servers and/or devices configured to communicate via one or more networks, such as a wireless network (e.g., a WiFi or cellular network), an open network (e.g., the Internet), a local area network, a wide area network and/or short-range network (e.g., a Bluetooth or Bluetooth Low Energy network or an NFC connection). It will be appreciated that which particular networks are used for communications may depend on (for example) what devices and/or servers are communicating, a type of a communication, and so on.

Network 100 can be configured to facilitate performance of a task and/or protection against alteration of data associated with the task. The protection can involve protecting against any alteration (e.g., modification, manipulation, deactivation, destruction, or any other such change) of a data element (e.g., a token, a credential, a certification, or other such identifier). As shown as a first action in FIG. 1, a first user device 105 can request the credential from a credential management server 110. First user device 105 can include an electronic device, which may, but need not, be a portable user device. For example, first user device 105 can include a smart phone, wearable device (e.g., smart watch), tablet, laptop, and/or any other such computing device. Further, first user device 105 can include a capability for conducting a secure transaction, such as a secure element or other such secure storage/processor.

The request can include information that represents a credential or is to be associated with the credential. For example, the request can include an account number and/or device identifier (e.g., a MAC address). Credential management server 110 can identify the credential, e.g., by generating or otherwise identifying the credential locally or by requesting the credential (or part of the credential) from another device. For example, in the depicted instance, credential management server 110 requests the credential from an access control server 115 at a second action.

Credential management server 110 can generate the credential using a defined token-generation technique or by requesting at least part of the credential from another system, such as a Token Service Provider. In some instances, credential management server 110 requests and receives a first part of the credential from another system and locally generates or identifies a second part of the credential, such as a part corresponding to one or more keys, such as a token key and/or card verification value key.

The credential can be generated (e.g., in part or in its entirety at credential management server 110, access control server 115, or another system) using (for example) a defined algorithm, look-up table and/or pseudorandom function. In some instances, the credential is generated so as to include or to be based on an account identifier (e.g., primary account number) and/or undeterminable number (e.g., a time of day or random number). For example, the credential can include an encrypted combination of an account identifier and undeterminable number.

Access control server 115 returns the credential (or portion thereof) at a third action. Credential management server 110 can then store the credential (e.g., independently; in association with an identifier of an account; and/or in association with an identifier associated with first user device 105, such as a unique device identifier). The credential can be stored, for example, at a local or remote data store managed and/or accessible to credential management server 110. In some instances, storing the credential includes generating a data element (e.g., associated with one or more indices) that includes the credential, the data element being a part (or being added to) a data structure, such as a table or array.

A fourth action can include credential management server 110 returning the credential to first user device 105. First user device 105 can then store the credential locally (e.g., in association with information corresponding to a particular account, such as a number, company and/or image). The credential can be stored in a manner to, for example, be accessible to a single application, multiple applications, or all applications being executed on first user device 105. In some instances, the credential is stored at a secure data store, such as at a secure element of first user device 105. The credential can be stored in association with other information, such as one or more keys (e.g., token key and/or verification value key) and/or network identifier.

First user device 105 can transmit a task request to a task managing server 120 via a fifth action. Task managing server 120 can include a server, such as an app server, that processes, routes and/or generates communications to facilitate performance of a task. The task may include a task involving a plurality of users and/or a plurality of user devices. For example, the task can include a task performed by one user for, or in response to a request submitted by, another user. The task may include one for which payment is to be collected (e.g., electronically or non-electronically) by task managing server 120, the task performing user or a device associated with the task-performing user. The task may include an extended-duration task, which can indicate that the task cannot be immediately performed and/or that performance of the task takes (or is of a type that typically takes) a duration longer than a defined duration (e.g., 1 minute, 5 minutes, 10 minutes, 15 minutes, 20 minutes, 1 hour, 12 hours, 1 day, 1 week, or 1 month). An extended-duration task may involve continuously performing part of the task across the entire duration, or performing parts of the task discretely at different times throughout the entire duration.

The task may include a virtual task or non-virtual task. Exemplary non-virtual tasks include providing a ride in a vehicle (e.g., car, van, sports utility vehicle, pickup truck, etc.) to transport a user from a first location to a second location (e.g., one or both of the first and second locations being identified by the user); retrieving a physical object (e.g., food) from a first location and bringing the object to a second location (e.g., the object, first location and/or second location being identified by the user); and/or providing a service for a user, such as a drink service, childcare service, automotive mechanical service, electrician service, and so on (e.g., of a type and/or at a location as identified by the user). Exemplary virtual tasks include transmitting a content object, such as a video or audio file, via download or streaming to a user device (e.g., the content object having been requested by a user device); converting a file from a first format to a second format (e.g., the second format being identified by the user device and/or the file in the first format having been transmitted by the user device); and/or hosting or storing content (e.g., received from a user device). Both virtual and non-virtual tasks can be one-time tasks or recurring tasks (e.g., a subscription).

In some instances, task managing server 120 can transmit an interface (e.g., a webpage or app page) to first user device 105. The interface can identify part or all of a potential task. The interface may include one or more fields and/or input components for accepting input to at least partly define the potential task and/or to request that the task be performed. Thus, upon detecting one or more particular inputs, first user device 105 can transmit a task request to task managing server 120 at a fifth action.

Task managing server 120 can process the task request to determine whether the request is complete and to identify one or more task specifications. For example, a task specification can include data in the request that corresponds to or includes data input at first user device 105, data in the request that identifies a field or option selected via input at first user device 105 and/or data or metadata that identifies automatically detected information, such as a particular interface via which the request was received, a location of the user device, a time and/or a device type. Task managing server 120 can then generate a record or data object for the request, which can include the one or more task specifications, an identifier of each of one or more resources and/or of one or more second user devices to be involved in execution of the task, and/or one or more identifiers associated with first user device 105 (e.g., a unique device identifier, user identifier, operating system, and/or device type).

In instances where a task involves another user device, task managing server 120 can transmit task data (e.g., including one, more or all task specifications) to a second user device 125 at a sixth action. Second user device 125 can include one or more stored instructions that process the task data so as to generate information to be presented at a display of second user device 125 that identifies one or more specifications of a task. The information can also include an acceptance option and/or rejection option that are selectable via input.

Second user device 125 can include a device identified by task managing server 120 and/or first user device 105. For example, a request from first user device 105 may include a task specification or constraint (e.g., location constraint, resource-access constraint, etc.), and task managing server 120 can use the task specification or constraint to identify a second user device 125 that corresponds to the specification or constraint. Task managing server 120 can further or alternatively use one or more selection techniques to identify second user device (e.g., from amongst a set of potential second user devices). A selection technique can be configured to identify a second user device by (for example) weighting or filtering individual potential second user devices based on, e.g., availability, scheduled availability, past task performance, a characteristic of the second user device (or corresponding user), and/or location. A selection technique may further or alternatively be configured to make a selection based on a pseudorandom selection technique and/or technique biased towards distributing or congregating tasks (e.g., to temporally or geographically).

In various instances, upon transmitting task data to second user device 125, task managing server 120 can (but need not) require receiving an acceptance communication from second user device 125. The acceptance communication can indicate that an input detected at second user device 125 indicated that a task associated with information that was presented was accepted.

Task managing server 120 can transmit a task confirmation communication at a seventh action. The task confirmation can (but need not) include one or more task specifications. When the task data (e.g., transmitted at sixth action) includes one or more specifications, the one or more task specifications included in the task confirmation can include the same (or can be different than) task specifications as those in the task data communicated from first user device 105. For example, first user device 105 can identify an initial location in task data, and a task confirmation can identify the same or a different initial location. In some instances, task managing server 120 automatically generates one or more task specifications, which can (but need not) depend on information in the task data received from first user device 105. For example, a task specification can include any/all of directions from an initial location to a destination location (or just a destination), a value to be provided to an account associated with second user device 125, an estimated task duration, one or more resources to be used for task performance, and so on.

The task confirmation can identify a conditional or unconditional indication that the task is to be performed. A condition can include, for example, a positive verification of a credential associated with first user device 105. The condition can be, for example, identified in the task confirmation implicitly, based on a standard task-execution protocol.

At an eighth action, first user device 105 transmits the credential to task managing server 120. The credential transmission can be (for example) triggered by any/all of receipt of the task confirmation, receipt of a request for the credential, detection that a current time corresponds to a time defined for the task, detection that first user device 105 is near second user device 125 (e.g., via an ability to connect over a short-range network), or detection of particular input at first user device 105 requesting or authorizing transmission of the credential (e.g., a tap, biometric-identifying input, or touch input). In response to the trigger, first user device 105 can retrieve the credential and, in some instances, other associated information from a data store, such as a secure element. In some instances, the credential is transmitted as part of another data element, such as a cryptogram, which can be generated at the device based on (for example) the retrieved credential and potentially other information (e.g., a token key, verification value and/or transaction identifier). The cryptogram can include, for example, a nested structure with a header that includes information for decrypting the cryptogram and verifying the credential. The cryptogram can also include a signature of the credential and header data. Task managing server 120 can store the credential or cryptogram as part of and/or in association with a record or data object associated with the request.

Task managing server 120 can transmit the credential or cryptogram to credential management server 110 at a ninth action. Data or metadata of the transmission or the mere transmission of the credential or cryptogram can indicate that the transmission corresponds to a request to monitor the status, to monitor an operability and/or validity of the credential, and/or to receive a notification in response to a detection of any or any particular change to the credential.

In some instances, credential management server 110 performs an authentication assessment to determine whether task managing server 120 is authorized to receive information pertaining to the particular credential or to any credential, generally. The assessment can include, for example, determining whether task managing server 120 and/or an associated entity is included in a data structure identifying registered systems or entities or whether the transmission includes a valid authentication variable or other authentication data element (e.g., signature).

To determine the authorization status, credential management server 110 can (for example) query a local or remote data structure (e.g., stored at and/or managed by credential management server 110 or a Token Service Provider) to determine whether a data element in the structure corresponds to the credential. In some instances, it can be determined that task managing server 120 is authorized to monitor a status of a credential and/or that a credential is valid when a data element in the data structure corresponds to the credential. In some instances, a determination that task managing server 120 is authorized to monitor a status of a credential and/or that a credential is valid further or alternatively requires validation of a cryptogram representing the credential using a token key. In some instances, a determination that task managing server 120 is authorized to monitor a status of a credential and/or that a credential is valid further or alternatively requires de-tokenizing a credential and verifying a represented account identifier.

If the credential is determined not to be valid or if it determined that task managing server 120 is not authorized to monitor a status of the credential, credential management server 110 can transmit a response communication to task managing server 120 indicating a denial of the request to perform credential monitoring and/or an indicate that the credential cannot be confirmed by credential management system 110 as being valid.

If the credential is determined to be valid and/or if it determined that task managing server 120 is authorized to monitor a status of the credential, credential management server 110 can transmit a response communication to task managing server 120 indicating that the credential is valid and/or to accept the request to perform credential monitoring. Credential management server 110 can also or alternatively add an identifier of or associated with task managing server 120 to the data structure (stored at a data store) in association with the credential. For example, an identifier of task managing server 120 can be added to a data element that includes the credential, or a new data element identifying task managing server 120 can be added to another data structure (stored at a data store) in a manner such that the credential-associated data element has a first index that corresponds to a second index of the new data element. The identifier of or associated with task managing server 120 can include, for example, a device identifier of the server, an email address, and/or an FTP address. It will be appreciated that one or more data structures managed at and/or accessible to credential management server 110 can be configured such that a single credential is associated with an identifier of and/or associated with each of multiple task managing servers.

Upon having transmitted the credential from task managing server 120 to credential management server 110 (e.g., and having received a response communication indicating a validity of the credential and/or confirming performance of credential monitoring; or not having received a response communication indicating that the credential cannot be confirmed as being valid and/or that the credential-monitoring request is not accepted), task managing server 120 can initiate a task performance. The initiation can include sending an instruction to a device to perform a task action. For example, a communication can be sent to second user device 125, which causes information to be presented (e.g., displayed) at second user device 125 indicating that task performance is to begin, that includes one or more task specifications and/or is indicative of an authorization to begin the task. For example, the second user device 125 can receive confirmation that a valid payment credential has been associated with the task.

In a first circumstance, at a tenth action, first user device 105 can subsequently transmit a communication to credential management server 110 corresponding to a request to modify information associated with the credential, change a status associated with the credential, or to cancel (e.g., destroy) or otherwise invalidate the credential. The communication can include one transmitted during a performance of a task. In one particular instance, the communication is transmitted while a resource 130 (e.g., a vehicle) being operated by a user of second user device 125 is being used for the task and/or when both first user device 105 and second user device 125 are located inside a resource-associated location (e.g., vehicle or building).

The communication can identify a particular credential (e.g., by including the credential or one or more other information fields associated with the particular credential) and identify the requested action (e.g., a modification or cancellation). When a modification is being requested, one or more changes can be identified, such as an identification of a data field (e.g., associated with a company name, holder's name, account number and/or expiration date) and a new value for the field.

The communication can be transmitted, for example, in response to receiving input at first user device 105 that corresponds to a request to make the modification of the credential-associated information or to cancel the credential. For example, a modification may request that one or more pieces of information (e.g., an expiration date) be changed. Depending on the embodiment, a credential-managing rule at credential management server 110 can (for example) indicate that the modification (or a modification of a given type or any modification) can result in an existing credential being destroyed and a new credential (associated with the modified information) being generated, or information associated with the existing credential can be modified.

Further depending on the embodiment, a credential-managing rule at credential management server 110 can indicate that the requested action of canceling the credential or modifying credential-associated information be performed automatically or be performed upon a determination that one or more conditions are satisfied. The one or more conditions can be configured to be satisfied, for example, upon determining that a request for the modification or cancellation is being received from a same device to which the credential was initially transmitted, determining that at least a threshold amount of time has passed since the credential was generated or previously modified, determining that an authentication data element (e.g., alphanumeric or biometric password) provided in the request or in association with the request matches a stored authentication data element, and so on. In some instances, credential management server 110 alerts and/or involves access control server 115 in any cancellation of and/or modification to a credential. For example, credential management server 110 can generate a modified credential by requesting a new credential from access control server 115 that it associates with modified data provided in the request.

The request transmission transmitted from first user device 105 to credential management server 110 (at the tenth action of the first circumstance) can identify a particular credential (e.g., by including the credential or one or more other information fields associated with the particular credential) and identify the requested action (e.g., a modification or cancellation). When a modification is being requested, one or more changes can be identified in the request, such as an identification of a data field (e.g., associated with a company name, holder's name, account number and/or expiration date) and a new value for the field.

Upon modifying or cancelling the credential, or upon receiving the request to modify or cancel the credential, credential management server 110 can determine whether the credential (for which a cancellation or modification is being requested) is associated with any identifiers of systems (e.g., including one or more servers and/or one or more devices) or entities (e.g., by transmitting a query or look-up request to a data structure). For example, one or more systems or entities, e.g., corresponding to a service provider with an on-going transaction associated with the credential, can register to receive alerts when a status of the credential changes.

Credential management server 110 can then transmit an alert communication to each identified system and/or entity (e.g., via an address stored for the system or entity) at an eleventh action of the first circumstance. The alert communication can indicate that a modification or cancellation request was made involving the credential (generally), identify whether the request was for a modification or cancellation, indicate that the credential was modified or cancelled, identify a time of receipt of the request, and/or identify a time of the modification or action. The alert communication can include the credential or other information identifying the credential and/or data corresponding to a device associated with the credential (e.g., a device identifier, address, and/or device type). The alert communication can include one or more data points included in the credential transmission from task managing server 120 to credential management server 110 at the ninth action, such as an identifier of the task and/or one or more other resources or devices associated with the task.

Task managing server 120 can transmit a second alert communication to one or more resources and/or devices involved in performance of the task at a twelfth action of the first circumstance. For example, the second alert communication can be transmitted to second user device 125. Transmission of the second alert communication can cause (for example) information to be presented (e.g., information indicating that a provided credential has been rendered invalid for the transaction or information indicating that a task performance is to stop or another credential is to be requested). Transmission of the second alert communication can cause a task action to stop or not to be initiated (e.g., where a task performance includes multiple task action and at least one had not yet begun). The second alert communication can include information corresponding to the task (e.g., a task identifier, task destination, task status and/or planned task result) and/or information corresponding to first user device (e.g., a name), which can facilitate identification of a task to which the alert corresponds. As a result of the alert, the task may be prematurely terminated, or the task may be stalled until a new credential is received at task managing server 120 and verified.

A second circumstance can relate to an instance where no request for credential modification or cancellation is received at credential management server 110 during performance of the task. In this instance, task managing server 120 can receive an indication that a task has been completed (e.g., from second user device) at a tenth action in the second circumstance. The completion indication can, for example, identify the task, a result of the task (e.g., a distance; temporal duration; current time; and/or number, identities and/or values of provided items) and/or one or more resources involved in the task. The completion indication can be generated and transmitted automatically upon determining that a particular transmission condition is satisfied (e.g., that second user device 125 is at a particular location, that a current time matches or exceeds a defined completion time, and/or that a transmission of content from second user device 125 to first user device 105 has completed).

Completion of the task can trigger a charge against the credential or a transfer of a value (e.g., in a defined currency) from an account associated with credential to a destination, such as an account associated with another device or system (e.g., second user device 125 and/or task managing server 120). Thus, in the depicted instance, upon receiving the indication, task managing server 120 can transmit a transfer request (or settlement) and the credential to coordination server 135 at the eleventh action in the second circumstance. In some instances, the credential can be transmitted as part of a data element, such as a cryptogram, which can be generated (e.g., at task managing server 120) using the credential, a token key, a value to be transferred, and/or a transaction identifier.

The request can indicate (e.g., via a cryptogram or other data element) a value requested for the transfer and/or one or more specifications of a destination. Coordination server 135 can include a server involved in managing an account of task managing server 120 so as to facilitate transfers from and to the account.

Coordination server 135 can identify an entity identifier (e.g., bank identification number) from the request and can transmit a request (e.g., to a Token Service Provider) that a credential be de-tokenized. De-tokenizing the credential can include validating a cryptogram (e.g., using a token key), decrypting the cryptogram, extracting the credential from the decrypted cryptogram, and identifying an account identifier corresponding to the credential (e.g., via a look-up table or defined algorithm).

Coordination server 135 can use the entity identifier and/or account identifier to identify access control server 115, from amongst a plurality of access control servers, as being associated with the credential. A request with the credential or de-tokenized data and requested transfer value can then be transmitted to access control server 115 at a twelfth action in the second circumstance. The transmission can occur through a network, such as a payment network. The request can further include an identification of destination to which the value is to be transferred, which can include a destination associated with task managing server 120 and managed by coordination server 135.

Access control server 115 (or a network through which the request was transmitted) can identify a particular account associated with first user device 105 and associated with the transmitted credential or de-tokenized data. Access control server 115 can identify a status of the account. When the status indicates that a value exceeds a threshold (e.g., the threshold being equal to or defined based on a requested value), access control server 115 can authorize and initiate the transfer of the value.

Access control server 115 can transmit, at a thirteenth action of the second circumstance, an alert communication to credential management server 110 indicating that the task has been completed. The alert communication can include a task identifier, the credential, an identification of task managing server 120 and/or an identification of first user device 105. Credential management server 110 can then update a data structure in a manner such that monitoring of the credential performed in association with the task is stopped. For example, an association between the credential and an identifier associated with the task (e.g., a system, entity, device and/or task) can be deleted.

It will be appreciated that credential monitoring can be performed for a variety of types of tasks, such as a single, discrete tasks; a set of discrete tasks; a recurring task (e.g., corresponding to multiple iterations); or a continuous task. Depending on the task type and/or one or more other factors, different protocols can be used to determine whether and when to stopping monitoring of a credential in association with a task. For example, in various instances, monitoring can continue until a defined threshold number of task-completion alerts are received, a defined type of task-completion alert is received, task managing server 120 transmits a stop-monitoring request (e.g., identifying a task and/or credential) to credential management server, and/or first user device 105 transmits a stop-monitoring request (e.g., identifying a task and/or credential) to credential management server.

It will also be appreciated that, while descriptions and/or figures herein make reference to particular servers, different types of systems are contemplated. For example, any of the servers depicted in FIG. 1 can represent a server farm or other collection of devices.

As one particular example, task managing server 120 can include a server supporting a ride-sharing application, which both first user device 105 and second user device 125 can have installed. First user device 105 can transmit a request for a ride (responsive to detecting corresponding input) from an initial location to a destination location. As part of a same or different communication to task managing server 120, first user device 105 can retrieve a credential stored in a secure element of first user device 105 that represents a payment instrument, such as a credit card. Task managing server 120 can validate that the credential represents (or is associated with) an active account and then send the credential (e.g., along with a task identifier) to credential management server (e.g., which can manage one or more accounts stored at the secure element on first user device 105) as part of a monitoring request. Credential management server 110 can update a data structure such that the credential is associated with task managing server 120, a task identifier, or another related identifier, such that any modification or cancellation of the credential triggers an alert to be sent to task managing server 120.

Task managing server 120 can further identify that data associated with second user device 125 indicates an availability and situation (e.g., nearby location) for being able to provide the ride. Task managing server 120 can transmit a request with, e.g., the initial and destination locations to second user device 125, which can respond with an acceptance indication.

In some instances, during a ride, first user device 105 may delete, cancel, or modify the credential, e.g., by altering data associated with the credit card in response to user input. This type of modification or cancellation can include communicating the modification or cancellation to credential management server 110, which can identify task managing server 120 as being subscribed to receive alerts of modifications or cancellations of the credential. Credential management server 110 can accordingly transmit an alert to task managing server 120. The alert can identify any/all of the credential, first user device 105, and/or a task, such that task managing server 120 can retrieve task data to determine that second user device 125 is involved in the task. Task managing server 120 can transmit a communication to second user device 125 that causes information to be presented that indicates that the ride is to stop and/or that a new credential is to be requested.

In another instance, if no cancellation or modification occurs during the ride, the association between the credential and identifier of the task, identifier of task managing server 120, or other related identifier can be maintained throughout the transaction (e.g., ride). A settlement amount for the transaction can then be determined, and a request can be sent from task managing server 120 to a coordination server 135 (e.g., a server of an acquirer bank), which can coordinate with access control server 115 (e.g., a server of an issuer bank) the transfer from an account associated with the credential to an account associated with task managing server 120. Alternatively, a charge can be registered against an account associated with the credential in favor of the service provider in the transaction. Upon a successful transfer (e.g., as indicated via a communication from access control server 115 or from task managing server 120) or charge, credential management server 110 can delete the association, as alerts relating to the credential may no longer be required.

As another example, task managing server 120 can include a server coordinating subscriptions to a gym (or any other such recurring, periodic subscription). A monthly transfer (or other such charge) can be made from an account associated with first user device 105 and credential to an account associated with the gym. Task managing server 120 can request that credential management server 110 send an alert in response to detecting a modification to or cancellation of the credential, or another event relating to the ability to use the credential for a transaction (e.g., a current or upcoming inactive status of an associated account, such as one occurring after an expiration date). Due to the recurring nature of the task (e.g., provision of gym availability), credential management server 110 can maintain an association between the credential and any/all of the identifier of the task, identifier of task managing server 120, or other related identifier until a request is received (e.g., from task managing server 120 or, in some instances, from first user device 105) to terminate the credential monitoring.

Figure 2:
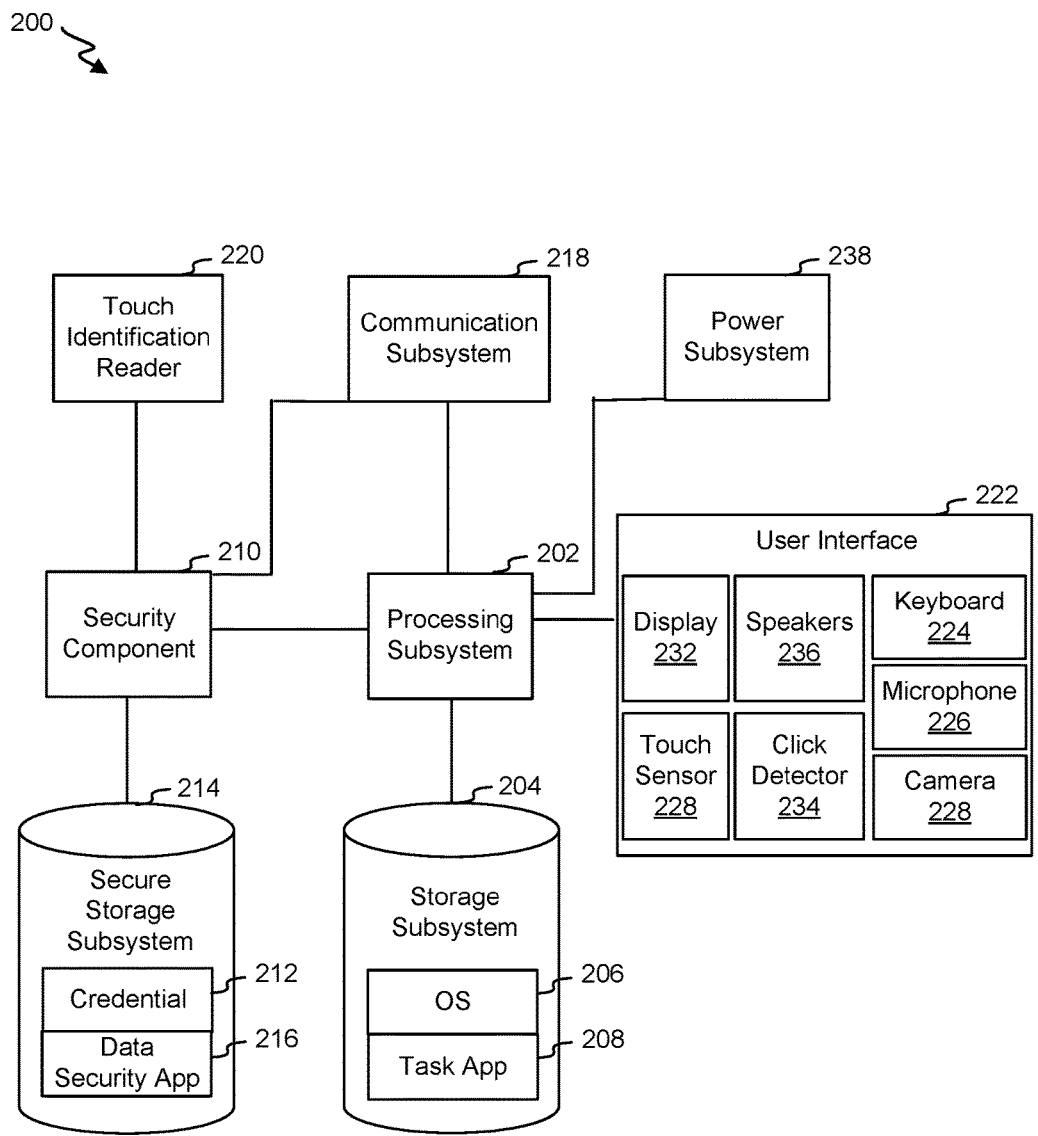
FIG. 2 is a block diagram of an example user device.

FIG. 2 is a block diagram of an example user device 200. For example, first user device 105 and/or second user device 125 can include some or all of the components identified in FIG. 2 and/or can have some or all of the properties and/or functionalities described herein with respect to FIG. 2. User device 200 can include a portable electronic device (e.g., a smart phone, laptop, tablet, or smart wearable device) or a non-portable electronic device (e.g., a desktop computer or set-top box).

User device 200 includes a processing subsystem 202, which can be or include one or more of: a microprocessor, a central processing unit (CPU), a general-purpose processor, an application-specific integrated circuit (ASIC), a programmable logic device, a digital signal processor (DSP), a secure processor, or combinations of such devices. Processing subsystem 202 can include a single-core or multi-core microprocessor. Processing subsystem 202 can include a single processor or processing unit, multiple processors, multiple processing units, or other suitably configured computing element or elements. In operation, processing subsystem 202 can control the operation of part of user device 200. In various embodiments, processing subsystem 202 can execute a variety of programs in response to program code and can maintain multiple concurrently executing programs or processes. Thus, through suitable programming, processing subsystem 202 can provide various functionality for user device 200.

Data from a storage subsystem 204 can be accessible to and used by processing subsystem 202, which can be implemented, e.g., using magnetic storage media, flash memory, other semiconductor memory (e.g., DRAM, SRAM), or any other non-transitory storage medium, or a combination of media, and can include volatile and/or non-volatile media.

Processing subsystem 202 can execute an operating system (OS) 206 stored in storage subsystem 204. Processing subsystem 202 can further execute one or more applications, such as a browser application, email application, and/or word processor application. An application can be configured to operate to perform part(s) of a technique described herein. At least one application of the one or more applications can include a task application 208, configured to facilitate requesting performance of a task and/or to facilitate performance of a task. For example, task application 208 can include an application configured to facilitate ride sharing, file sharing, content translation, webpage development, and/or file conversion. In some instances, a task is performed by one or more remote servers. In some instances, a task is performed, in part, via one or more actions performed by a user associated with another device. For example, a request can be received at a first user device for a ride between two specified locations, translation of an uploaded content object, development of a webpage corresponding to one or more specifications and/or conversion of an uploaded file, and the ride, translation, development, or conversion can be performed at least in part based on one or more actions performed at a second user device.

User device 200 can include a security component 210 that controls access to a credential 212, e.g., a token, identifier, certificate, etc., stored at a secure storage subsystem 214. In some implementations, the credential 212 can be an actual representation of a credential or an abstraction of a credential (e.g., a tokenized credential). Secure storage subsystem 214 can be implemented, e.g., using magnetic storage media, flash memory, other semiconductor memory (e.g., DRAM, SRAM), or any other non-transitory storage medium, or a combination of media, and can include volatile and/or non-volatile media.

Security component 210 can be configured to, for example, execute a data security application 216 that determines whether a condition has been satisfied and only retrieves and/or provides for access to credential 212 when the condition is satisfied. Providing access can include generating an encrypted version of credential 212 and, potentially other related information, such as by generating a cryptogram. Providing access can include releasing or transmitting credential 212 or a processed and/or encrypted version thereof to another component of user device 200, such as to processing subsystem 202 such that it can be acted on in accordance with task application 208, or to a communication subsystem 218, such that credential 212 (or processed and/or encrypted version thereof) can be transmitted to another device.

A condition can include, for example, having detected an internally or externally generated request for credential 212 (e.g., a request from a task managing server or a request from execution of task application 208) and/or having detected one or more particular types of user input corresponding to a request or instruction to release credential 212. Detecting the particular type of user input can include (for example) detecting that a user is engaging (e.g., touching or placing a finger above or near) a touch identification reader 220 (e.g., which can include a pressure, capacitive, or resistive detecting component, switch, and/or image sensor) or providing other authorization input (e.g., any/all of mechanical, biometric, motion, etc.). The detection can further include determining that user input corresponds to a particular user (e.g., via determining that one or more fingerprint (or other biometric) characteristics match a user profile or that a voice having provided a voice command has one or more voice characteristics that match a user profile). Security component 210, in some instances, includes part or all of a chip and/or a secure element.

User device 200 can send and receive communications via communication subsystem 218, which can include a transmitter, receiver and/or transceiver. Communication subsystem 218 can include (for example) an antenna to wirelessly transmit and/or receive signals using a network such as a WiFi network. Communication subsystem 218 can further or alternatively be configured to support transmission and/or receipt of communications over a short-range network, such as a Bluetooth, Bluetooth Low Energy or Near Field Communication network.

Communication subsystem 218 can include (for example) a radio frequency (RF) interface that can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. In some embodiments, an RF interface (included in or connected to communication subsystem 218) can implement a Bluetooth LE (Low energy) proximity sensor that supports proximity detection through an estimation of signal strength and/or other protocols for determining proximity to another electronic device. The RF interface can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into the RF interface.

Communication subsystem 218 can also or alternatively include a connector interface that can allow user device 200 to communicate with various devices (e.g., a server or coordinating device) via a wired communication path, e.g., using Universal Serial Bus (USB), universal asynchronous receiver/transmitter (UART), or other protocols for wired data communication.

In some embodiments, a connector interface and/or RF interface can be used to support synchronization operations in which data is transferred from a another device (e.g., a payment terminal, server or other user device) to user device 200 (or vice versa). For example, a user can be able to customize settings and other information for user device 200. While a user interface 222 can support data-entry operations, a user can find it more convenient to define customized information on a separate device (e.g., a tablet or smartphone) that may have a larger interface (e.g., including a real or virtual alphanumeric keyboard), then transfer the customized information to user device 200 via a synchronization operation. Synchronization operations can also be used to load and/or update other types of data in storage subsystem 204, such as media items, application programs, personal data, and/or operating system programs. Synchronization operations can be performed in response to an explicit user request and/or automatically.

User interface 222 can monitor inputs received by user device 200 and/or can control outputs presented by user device 200. For example, user interface 222 can include one or more input components to receive user input, including a keyboard 224 to receive alphanumeric input selections, a microphone 226 to receive vocal or audio inputs, a camera 228 (or image sensor) to detect visual (e.g., gesture) inputs, a touch sensor 230 to receive touch inputs (e.g., included in a track pad and/or to map particular touches or touch movements to corresponding to points or movements on a display 232) and/or a click detector 234 to detect clicks (e.g., on a mouse or track pad that correspond to particular points on first display). Each of one, more or all input components can convert a detected stimulus to an electrical signal, such as an electrical signal that corresponds to one or more letters, words, pixels, values or instructions.

Touch sensor 230 can include, e.g., a resistive and/or capacitive sensor array with the ability to localize contacts to a particular point or region on the surface of the sensor and in some instances, the ability to distinguish multiple simultaneous contacts. In some embodiments, touch sensor 230 can be overlaid over display 232 to provide a touchscreen interface, and processing subsystem 202 can translate touch events (including taps and/or other gestures made with one or more contacts) into specific user inputs depending on what is currently displayed on the display. To illustrate, one or more touch sensors can determine a location of a touch on a display. The touch sensor can be self-capacitive in certain embodiments, mutual-capacitive in others, or a combination thereof.

Click detector 234 can detect a click and/or depression of a button. For example, a click can be detected when an element underneath a button contacts an underlying device component to complete a circuit or when the depression of the button causes a switch to be activated or deactivated. In some instances, click detector 234 can detect a click and/or depression for each of a plurality of buttons and can identify which one was clicked.

Camera 228 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 204 and/or transmitted by user device 200 to other devices for storage. Depending on implementation, the optical components can provide fixed focal distance or variable focal distance; in the latter case, autofocus can be provided.

Microphone 226 can include any device that converts sound waves into electronic signals. In some embodiments, microphone 226 can be sufficiently sensitive to provide a representation of specific words spoken by a user; in other embodiments, microphone 226 can be usable to provide indications of general ambient sound levels without necessarily providing a high-quality electronic representation of specific sounds.

User interface 222 can also include one or more output components, such as display 232, speakers 236 or a haptic output (not shown). Each of one, more or all output components can convert an electrical stimulus to another type of stimulus, such as a visual, audio or haptic stimulus. Display 232 can be implemented using compact display technologies, e.g., LCD (liquid crystal display), LED (light-emitting diode), OLED (organic light-emitting diode), or the like.

In some instances, two or more of the depicted components can be integrated into a single component. For example, a touch screen can include both a display and touch sensor.

User device 200 can include a power subsystem 238, which can provide power and power management capabilities for user device 200. For example, power subsystem 238 can include a battery (e.g., a rechargeable battery) and associated circuitry to distribute power from the battery to other components of user device 200 that require electrical power. In some embodiments, power subsystem 238 can also include circuitry operable to charge the battery, e.g., when power or charging cord is connected to a power source. In some embodiments, power subsystem 238 can include a "wireless" charger, such as an inductive charger, to charge the battery without relying on a power or charging cord. In some embodiments, power subsystem 238 can also include other power sources, such as a solar cell, in addition to or instead of a battery.

In some embodiments, power subsystem 238 can control power distribution to components within user device 200 to manage power consumption efficiently. For example, power subsystem 238 can automatically place user device 200 into a "sleep" or "hibernation" state upon detecting that no inputs have been detected via one or more input components (e.g., keyboard 224, touch sensor 230 and/or click detector 234) for at least a defined period of time. The hibernation state can be designed to reduce power consumption; accordingly, one, more or all of display 232 and/or communication subsystem 218 can be powered down (e.g., to a low-power state or turned off entirely), while one or more input components (e.g., keyboard 224, touch sensor 230 and/or click detector 234) can be powered up (either continuously or at intervals) to detect when a user provides input at user device 200.

Power subsystem 238 can also provide other power management capabilities, such as regulating power consumption of other components of user device 200 based on the source and amount of available power, monitoring stored power in a battery, generating user alerts if the stored power drops below a minimum level, and so on.

In some embodiments, control functions of power subsystem 238 can be implemented using programmable or controllable circuits operating in response to control signals generated by processing subsystem 202 in response to program code executing thereon, or as a separate microprocessor or microcontroller. In some embodiments, control functions of power subsystem 238 can be based on user interaction with the device (e.g., to power down components if a device has not been interacted with in a particular manner, such as via a touch, button press or network activity, for a defined period of time).

In some instances, execution of task application 208 at processing subsystem 202 can cause an interface to be presented at display 232 (e.g., as a webpage or app page) that is configured to received one or more inputs that request a task performance and/or define one or more task features. Upon detecting one or more inputs corresponding to an indication to make the request and/or define task features, a communication can be generated and transmitted (via communication subsystem 218) to a task managing server associated with the application. In some instances, task application 208 indicates that credential 212 is to be simultaneously transmitted. In some instances, task application 208 indicates that credential 212 is to be transmitted at a different time (e.g., upon having received a request for credential 212 from the task managing server).

When credential 212 is to be transmitted, processing subsystem 202 can engage security component 210 and request retrieval of credential 212. Security component 210 can execute data security application 216, which can (for example) verify that a request for the credential is from a trusted application and/or includes one or more secure parameters. Execution of data security application 216 can, in some instances, select a credential out of multiple credentials. The selection can be based on (for example) a definition of a default credential and/or input detected at user interface 222 identifying a credential. Execution of data security application 216 can verify that one or more data-retrieval conditions have been satisfied, such as having received a particular type of user input (e.g., a user engagement at touch identification reader and/or verifying that a user input corresponds to a profile data element). Upon determining that the data-retrieval conditions are satisfied, execution of data security application 216 can cause credential 212 to be retrieved and potentially processed, which can include (for example) generating an encrypted version of credential 212, such as a cryptogram. Security component 210 can then release credential 212, or a processed version thereof, to processing subsystem 202 and/or communication subsystem 218, such that it can be transmitted to the task managing server.

Subsequently, security component 210 can detect (e.g., via execution of data security application 216) that input detected at user interface 222 corresponds to an instruction to modify or cancel credential 212 or associated information. In response to the instruction, a communication can be generated and transmitted to a credential management server that manages one or more credentials and the modification or destruction can be effected.

In some instances, user device 200 corresponds to a device used as part of a performance of a task. Communication subsystem 218 can receive a communication from a task managing server, which processing subsystem 202 can detect as corresponding to task application 208. Processing subsystem 202 can boot up task application 208 if it is not currently executing. Execution of task application 208 can cause information to be presented that identifies one or more task specifications as included in the communication and an input component configured to receive an input that indicates whether a task associated with the specification(s) is accepted.

When a task is accepted, execution of task application 208 can translate particular input provided at user interface 222 or particular sensor readings (e.g., detecting that a location is within a defined region or that a particular device is detected over a short-range network) to a task status or task-initiation indication. Processing subsystem 202 can generate a communication identifying the status, and communication subsystem 218 can transmit the status communication to the task managing system.

In some instances, a status subsequently indicates that a task is complete, and a communication identifying the status is generated or transmitted. In some instances, prior to the completion, communication subsystem 218 receives a communication from the task managing server that indicates that a credential associated with the task has been invalidated, modified or cancelled. The communication can cause processing subsystem 202 to (e.g., via execution of task application) present information (e.g., at display 232) that indicates that performance of the task is to stop and/or that an alternative credential is to be requested.

It will be appreciated that user device 200 is illustrative and that variations and modifications are possible. For example, user device 200 can include one or more sensors (e.g., as an accelerometer, gyroscope, pressure sensor and/or motion sensor) and/or a GPS receiver. As another example, user interface 222 can include fewer, different or additional input or output components, such as a haptic output. As another example, though not depicted, user device 200 can include one or more ports. To illustrate, user device 200 can include a power port, allowing user device 200 to receive power, e.g., to charge an internal battery. As another illustration, user device 200 can include a USB connector and supporting circuitry. A port can include a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which can be transmitted to or from another device in analog and/or digital formats.

Further, while user device 200 is described with reference to particular blocks, it is to be understood that these blocks are defined for convenience of description and are not intended to imply a particular physical arrangement of component parts. Further, the blocks need not (but can) correspond to physically distinct components. Blocks can be configured to perform various operations, e.g., by programming a processor or providing appropriate control circuitry, and various blocks might or might not be reconfigurable depending on how the initial configuration is obtained. Embodiments can be realized in a variety of apparatus including electronic devices implemented using any combination of circuitry and software. It is also not required that every block in FIG. 2 be implemented in a given embodiment of a user device.

Figure 3:
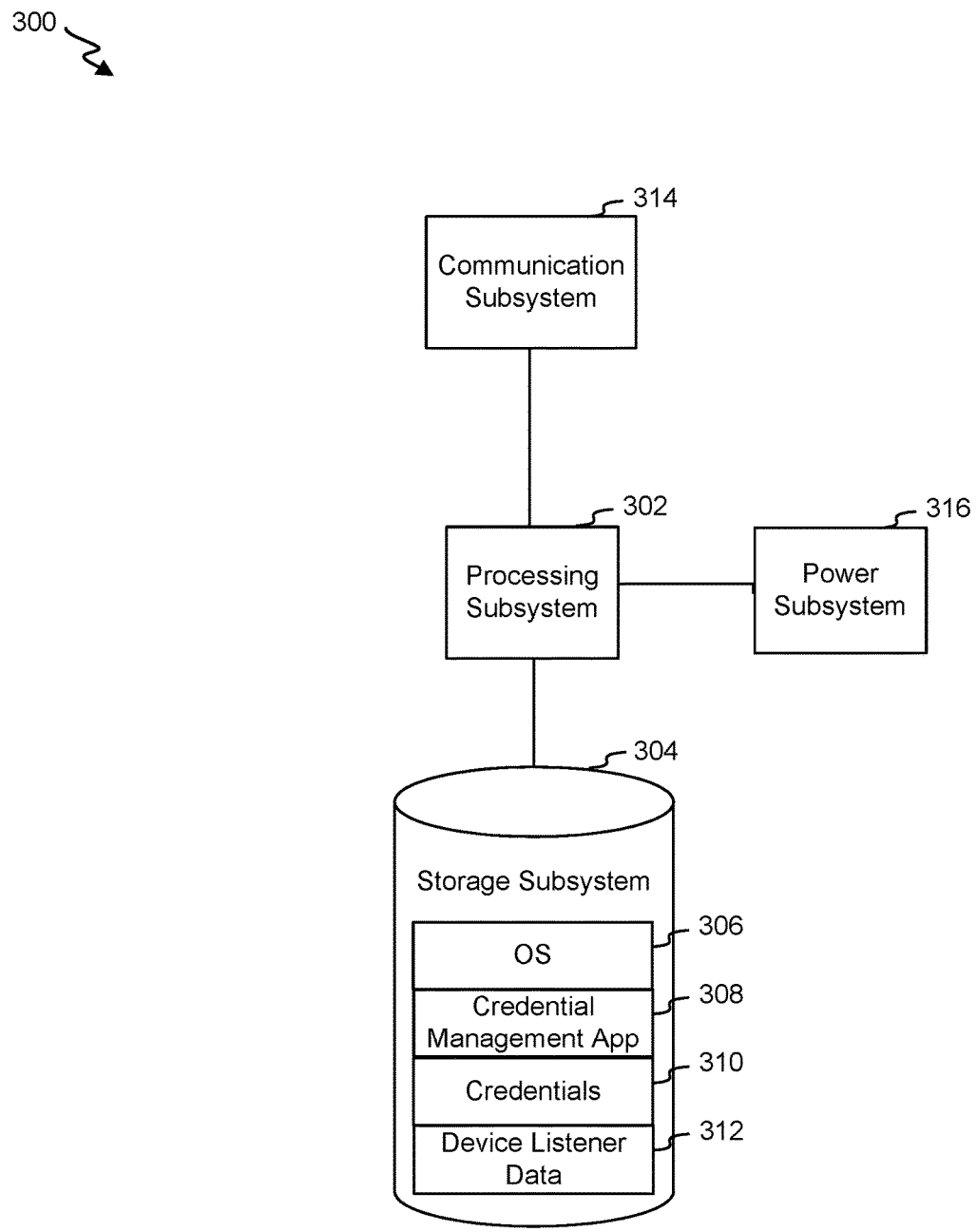
FIG. 3 is a block diagram of an example credential management server.

FIG. 3 is a block diagram of an example credential management server 300. Credential management server 300 includes a processing subsystem 302, which can include one or more of: a microprocessor, a central processing unit (CPU), a general-purpose processor, an application-specific integrated circuit (ASIC), a programmable logic device, a digital signal processor (DSP), a secure processor, or combinations of such devices. Processing subsystem 302 can include a single-core or multi-core microprocessor. Processing subsystem 302 can include a single processor or processing unit, multiple processors, multiple processing units, or other suitably configured computing element or elements. In operation, processing subsystem 302 can control the operation of part of credential management server 300. In various embodiments, processing subsystem 302 can execute a variety of programs in response to program code and can maintain multiple concurrently executing programs or processes. Thus, through suitable programming, processing subsystem 302 can provide various functionality for credential management server 300.

Data from a storage subsystem 304 can be accessible to and used by processing subsystem 302, which can be implemented, e.g., using magnetic storage media, flash memory, other semiconductor memory (e.g., DRAM, SRAM), or any other non-transitory storage medium, or a combination of media, and can include volatile and/or non-volatile media.

Processing subsystem 302 can execute an operating system (OS) 306 stored in storage subsystem 304. Processing subsystem 302 can further execute one or more applications, such as a credential management application 308. Credential management application 308 can be configured to track credentials assigned to various user devices. For example, credential management server 300 can receive a request from a device for a credential to be generated in association with particular data associated with an account. Execution of credential management application 308 can cause credential management server 300 to generate and transmit a communication to an access control server that includes the particular data and requests the credential. Upon receiving a response communication from the access control server with the credential, credential management server 300 can transmit the credential to the user device. In some implementations, credential management server 300 can also store the credential in a credential data store 310 in association with some or all of the particular data and an identifier of the device.

Periodically, credential management server 300 may receive another communication from a user device that requests that a credential be cancelled (or deactivated) or modified (e.g., to be associated with different particular data) or that indicates that the credential has been cancelled or modified. Credential management server 300 can relay the request or indication to a corresponding access control server and can further update credential data store 310 accordingly.

Execution of credential management application 308 can further facilitate apprising device listeners (or monitors) of credential status. Particularly, execution of credential management application 308 can facilitate processing of communications received from devices (e.g., task managing servers) that identify a credential and correspond to a request to be alerted when the credential is modified or cancelled. Such communications can be processed to verify that the requesting device(s) is authorized to monitor the status (e.g., as indicated by corresponding to an application of a set of authorized applications) and to extract data identifying (for example) a destination to which any alert is to be transmitted (e.g., an address of the task managing servers or another destination address), a task identifier and/or any indication as to a duration during which such alerts are requested. A device listener data store 312 can then be updated to associate the destination address (e.g., and task identifier and/or any absolute or functional monitoring duration) with an identifier of the credential. In some instances, credential data store 310 and device listener data store 312 are combined, such that a single data element associates a credential with a user device (and, in some instances, other particular data) and with an identification of one or more device listeners.

If a request or indication is received corresponding to a modification or cancellation of a credential, processing subsystem 302 (via execution of credential management application 308) can identify any devices associated with the credential in device listener data store 312 and can transmit an alert to each identified device. Processing subsystem 302 (via execution of credential management application 308) can also monitor for any events indicating that an association between a credential and destination address is to be deleted, such as an event indicating that a particular task is completed or an event corresponding to a request from a task managing server to cease the monitoring.

It will be appreciated that credential management application 308 can be configured to communicate with different task managing servers, such as multiple servers corresponding to multiple applications installed on one or more user devices.

Credential management server 300 can send and receive communications via communication subsystem 314, which can include a transmitter, receiver and/or transceiver. Communication subsystem 314 can include (for example) an antenna to wirelessly transmit and/or receive signals using a network such as a WiFi network.

Communication subsystem 314 can include (for example) a radio frequency (RF) interface that can include RF transceiver components such as an antenna and supporting circuitry to enable data communication over a wireless medium, e.g., using Wi-Fi (IEEE 802.11 family standards) or other protocols for wireless data communication. The RF interface can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into the RF interface.

Communication subsystem 314 can also or alternatively include a connector interface that can allow credential management server 300 to communicate with various devices (e.g., a server or coordinating device) via a path that includes wired communication path, e.g., using Universal Serial Bus (USB), universal asynchronous receiver/transmitter (UART), Ethernet, or other protocols for wired data communication.

Credential management server 300 can include a power subsystem 316, which can provide power and power management capabilities for credential management server 300. For example, power subsystem 316 can include a power port to receive a power plug and/or a battery (e.g., a rechargeable battery). Power subsystem 316 can further include circuitry to distribute power to components of credential management server 300 that require electrical power. In some embodiments, power subsystem 316 can also include circuitry operable to charge a battery, e.g., when power or charging cord is connected to a power source.

Figure 4:
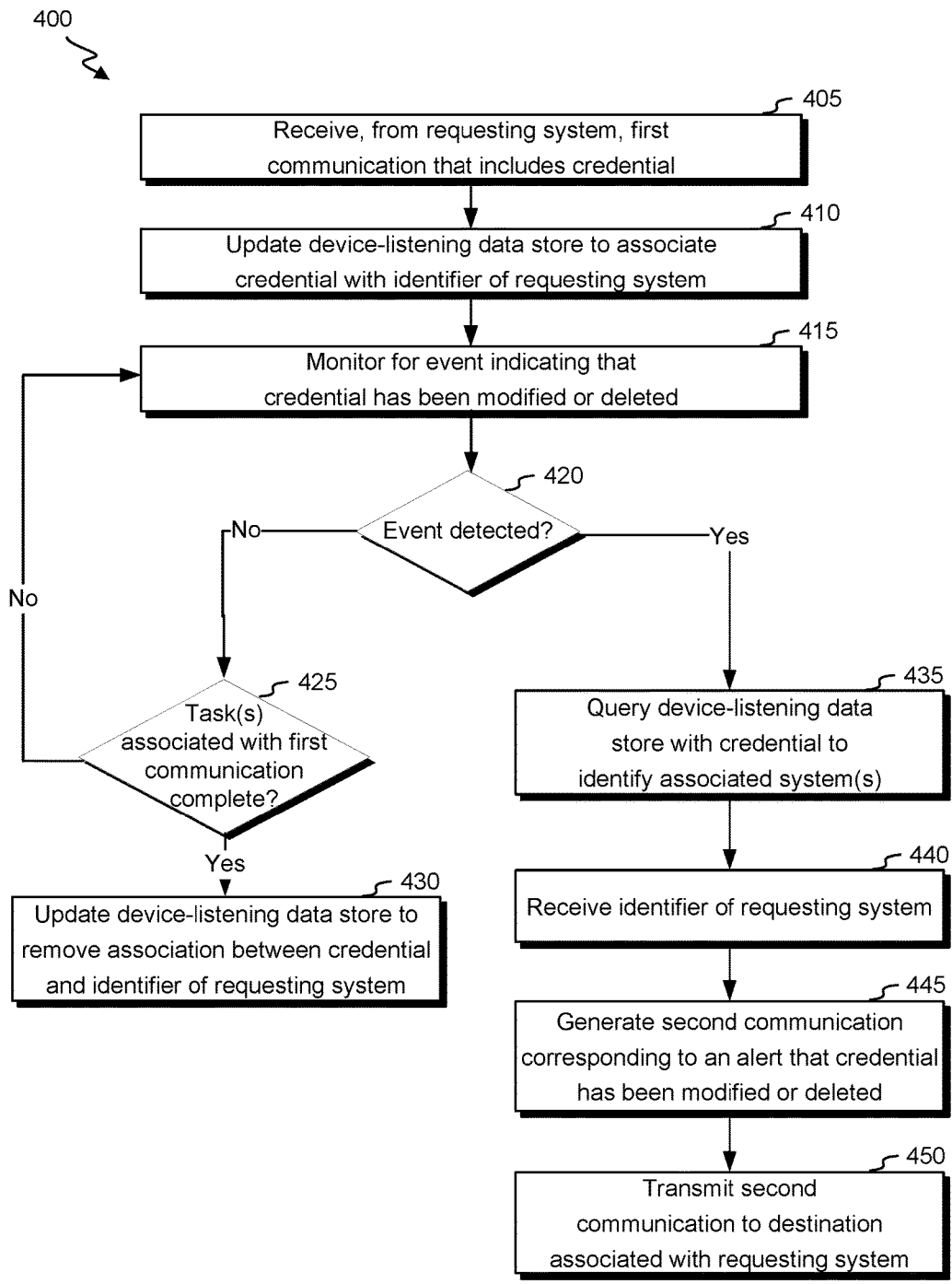
FIG. 4 is a flow diagram of an example process for providing protection against alteration of data.

FIG. 4 is a flow diagram of an example process for providing protection against alteration of data, such as the modification or cancellation of a credential while it is associated with a pending transaction. Part or all of process 400 can be performed by a credential management system, such as credential management server 110 or credential management server 300.

In process 400, a first communication can be received (405) from a requesting system. The first communication can include (or otherwise identify) a credential. The requesting system can include, for example, a task managing server. The first communication can correspond to an indication that an extended-duration task is being initiated and can correspond to a request to listen to (or monitor) a status of the credential.

In some instances, the first communication includes an encrypted and/or otherwise processed version of the credential. The first communication can, in some instances, also include one or more other data elements, such as an identifier of a task, an identifier of the requesting system (e.g., a destination address to which alerts are to be sent), one or more keys associated with the credential, and/or an identifier of a network. In some implementations, the credential can include and/or can correspond to one of a plurality of credentials stored at a data store managed by and/or accessible to a system performing process 400. The credential can include, for example, a representation of and/or data identifying an account as generated for a specific device. The credential can include a credential initially generated at an account-associated system, such as at an access control server, in response (for example) to receiving a request (e.g., directly from the user device or from the credential management system) that identifies the account and requests the credential.

A device-listening data store can be updated (410) to associate the credential with an identifier associated with the requesting system (e.g., an identifier of the requesting system or a destination address identified in the first communication). The association can indicate that the requesting system is to receive a notification of any modification to or cancellation of the credential. In some instances, associating the credential with the identifier associated with the requesting system is conditioned upon determining that the request is actionable, which can include (for example) determining that the requesting system corresponds to any of one or more authorized systems or determining that one or more data elements in the first communication correspond to the credential (e.g., as determined based on stored data).

Monitoring can be performed (415) for any event indicating that the credential has been modified or cancelled (e.g., including being deleted or otherwise deactivated). An event can include, for example, receiving a trigger communication from a user device (e.g., for which the credential was initially generated and/or associated with a task for which monitoring has been requested from one or more requesting systems) or from an access control system associated with the credential. The trigger communication can correspond to a request to modify or cancel the credential, or to an indication that the credential has been modified or cancelled. The trigger communication can include one generated in response to (for example) detection of input at the user device that requests the modification or cancellation.

In some instances, the modification or cancellation is an action that can be locally effected at the user device, but a communication is transmitted to the credential management system so as to facilitate management of credentials and/or to facilitate updating of a data store managed by the credential management system or another system in communication with the credential management system (e.g., an access control server). In some instances, the modification or cancellation requires a communication exchange between the user device (e.g., requesting the modification or deletion) and the credential management system. For example, an acknowledgement communication from the credential management system may be required before a data security application executing on the user device will modify or cancel the credential.

It can be determined whether any event has been detected (420) that indicates that the credential has been modified or cancelled. The event can include receiving a communication from a device (e.g., from any of one or more defined devices, such as a user device on which the credential is stored and/or for which the credential was initially generated; or from a credential management server) that requests a modification to or cancellation of the credential, or indicates that the credential has been modified or cancelled. The event can include one triggered by input detected at a user device (e.g., on which the credential is stored and/or for which the credential was initially generated) that requested the modification or cancellation. When no such event has been detected, it can be determined whether one or more tasks associated with the first communication are complete (425).

For example, in some instances, the first communication can correspond to a request to receive alerts of any modification to or cancellation of a credential throughout the duration of a single, discrete task. Determining whether the one or more tasks are complete can then include determining whether the single task is complete, which can be determined (for example) by determining whether a communication has been received (e.g., from a task managing server, access control server or a user device) that indicates that a task has been completed. In some implementations, receiving a final settlement request from a service provider can signal that a task is complete and that an alert request (or subscription) can be cancelled.

As another example, the first communication can correspond to a request to receive alerts of any modification to or cancellation of a credential throughout a duration of a performance of a defined number of tasks. Determining whether the one or more tasks are complete can then include determining whether each of the defined number of tasks is complete, which can be determined (for example) by determining whether one or more communications have been received that indicate that each of the defined number of tasks has been completed.

As still another example, the first communication can correspond to a request to receive alerts of any modification to or cancellation of a credential throughout a defined (e.g., absolute) duration of performance of one or more tasks. Determining whether the one or more tasks are complete can then include determining whether the defined duration has elapsed. As yet another example, the first communication can correspond to a request to receive alerts of any modification to or cancellation of a credential throughout a duration of performance of one or more tasks, the duration extending until an indication is received that the duration is terminated. Determining whether the one or more tasks are complete can then include determining whether the duration is complete, which can be determined (for example) by determining whether a communication has been received (e.g., from a task managing server) that indicates that duration has been terminated or will be terminated at a defined time (and that time has since passed).

When it is determined that one or more tasks associated with the first communication are not complete, monitoring for events continues (415). When it is determined that one or more tasks associated with the first communication are complete, the device-listening data store can be updated (430) to remove the association between the credential and the identifier associated with the requesting system.

When an event indicating that the credential has been modified or cancelled has been detected, the device-listening data store can be queried (435), using the credential (or other such associated information) to identify any systems associated with the credential, e.g., that have requested to be alerted in response to a change to the credential. An identifier associated with the requesting system can be received (440) as a result of the query. In some instances, multiple identifiers are returned in response to the query. For example, the multiple identifiers each can be associated with a requesting system and/or task (or set of tasks), such that each identifier can be associated with a given transaction.

A second communication can be generated (445) that corresponds to an alert indicating that the credential has been modified or cancelled. The second communication can identify any/all of the credential, an identifier of a task (e.g., as identified in the first communication), one or more other data elements identified in the first communication, and/or one or more other data elements associated with the credential (e.g., an identifier associated with a user device on which the credential was stored, for which the credential was generated, or that initiated the event). In instances where multiple identifiers are received as a result of the query, a same or different second communications can be generated for each identified requesting system (e.g., as different second communications can identify different tasks).

The second communication can be transmitted (450) to a destination associated with the requesting system. The destination can include (for example) any/all of the requesting system (or device of the requesting system), a device or system corresponding to the identifier associated with the credential, and/or a destination identified in the first communication.

It will be appreciated that fewer or more communications are contemplated as part of a communication exchange. For example, one or more additional actions can be added to process 400 where a notification communication is sent to a user device (on which the credential was stored or for which the credential was generated), upon detecting an event, that indicates that an event was detected and/or that identifies one or more destinations to which alerts are being sent. As another example, a notification communication can be sent to a user device (on which the credential was stored or for which the credential was generated), upon updating the device-listening data store, to indicate that the identifier has been associated with the credential such that events corresponding to the credential will trigger an alert to be sent to a destination associated with the requesting system. In some implementations, for some requested modifications and/or cancellations, a notification communication can be sent to a user device, e.g., on which the credential is stored, indicating that the requested modification or cancellation cannot be performed until an associated transaction, e.g., registered for alerts, has been completed.

Verifying credentials can be complicated when a verification is used for an extended-duration task. Relying on an initial verification of the credential prior to an initiation of a task can present susceptibilities to actions (malicious and/or non-malicious) changing a status of the credential during the task. Repeated checks of the credential can consume system resources and potentially slow task performance. Embodiments disclosed herein facilitate improved information and transaction security by providing an alert system, via which particular systems can be alerted to the modification and/or cancellation of a credential associated with a pending transaction. Thus, task managing systems can identify and maintain resource assignments for a task until a time at which an alert is received that a credential corresponding to the task has been modified or cancelled. The task managing system can then alter or stop performance of a task so as to efficiently allocate resources. Similarly, registration to receive an alert upon modification or cancellation of a credential associated with a transaction can be automatically cancelled once the transaction has been completed.

Embodiments, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various disclosed features can be encoded and stored on various computer readable storage media, suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A system for providing an alert, the system comprising:
   one or more data processors; and
   a non-transitory computer readable storage medium containing instructions which, when executed by the one or more data processors, cause the one or more data processors to perform actions including:
   receiving, from a requesting system, a first communication identifying a credential associated with a task, the first communication comprising a request to monitor a status of the credential;
   updating a device-listening data store to associate the credential with an identifier associated with the requesting system;
   monitoring for an event indicating that the credential has been modified or cancelled; and
   transmitting, upon detecting the event indicating that the credential has been modified or cancelled, an alert to the requesting system, using the identifier associated with the requesting system.

2. The system for providing an alert as recited in claim 1, wherein the actions further include:
   receiving, from a user device, an event communication that includes a request to modify or cancel the credential; and
   identifying the event communication as corresponding to the event.

3. The system for providing an alert as recited in claim 1, wherein the actions further include:
   querying a second data store based at least in part on the credential to identify a user device with which the credential is associated, the second data store associating each of a plurality of credentials with a single user device; and
   receiving, in response to the query of the second data store, an identifier of the user device,
   wherein the monitoring for an event indicating that the credential has been modified or cancelled includes monitoring for one or more communications from the user device corresponding to the credential.

4. The system for providing an alert as recited in claim 1, wherein:
   the first communication further includes an identifier of the task; and
   the update of the device-listening data store further associates the identifier associated with the requesting system with the identifier of the task.

5. The system for providing an alert as recited in claim 1, wherein the actions further include:
   detecting that the task has been completed; and
   updating the device-listening data store to delete the association of the credential with the identifier associated with the requesting system.

6. The system for providing an alert as recited in claim 1, wherein the task comprises an extended-duration task.

7. The system for providing an alert as recited in claim 6, wherein the actions further include:
   updating the device-listening data store to delete the association of the credential with the identifier associated with the requesting system based at least in part on expiration of a duration corresponding to the extended-duration task.

8. A computer-implemented method for generating an alert, the method comprising:
   receiving, from a requesting system, a request to monitor a credential associated with an extended-duration task throughout performance of the extended-duration task;
   updating a device-listening data store to associate the credential with an identifier corresponding to the requesting system;
   detecting, prior to receiving any indication of completion of the extended-duration task, an event indicating that the credential has been altered;
   transmitting an alert to a destination associated with the requesting system;
   detecting an indication that the extended-duration task is no longer being performed; and
   in response to the indication, updating the device-listening data store to remove the association of the credential with the identifier corresponding to the requesting system.

9. The computer-implemented method for generating an alert as recited in claim 8, further comprising:
   receiving, from a user device, an event communication that includes a request to modify or cancel the credential or an indication that the credential has been modified or cancelled; and
   identifying the event communication as the event indicating that the credential has been altered.

10. The computer-implemented method for generating an alert as recited in claim 9, wherein the user device requested performance of the extended-duration task.

11. The computer-implemented method for generating an alert as recited in claim 8, further comprising:
    querying, based on the credential, a second data store to identify a user device with which the credential is associated, the second data store associating each of a plurality of credentials with a single user device; and
    receiving, in response to the query of the second data store, an identifier of the user device, wherein detecting the event indicating that the credential has been altered includes detecting a communication from the user device corresponding to the credential.

12. The computer-implemented method for generating an alert as recited in claim 8, wherein:
    updating the device-listening data store further comprises associating a task identifier corresponding to the extended-duration task with the identifier corresponding to the requesting system.

13. The computer-implemented method for generating an alert as recited in claim 8, wherein the extended-duration task corresponds to a subscription.

14. The computer-implemented method for generating an alert as recited in claim 8, wherein the credential comprises a user account credential.

15. The computer-implemented method for generating an alert as recited in claim 8, wherein the credential comprises a payment credential associated with a payment instrument.

16. A computer-program product tangibly embodied in a non-transitory machine-readable storage medium, including instructions configured to cause one or more data processors to perform actions including:
    receiving, from a requesting system, a request to monitor a credential associated with an extended-duration task throughout performance of the extended-duration task;
    initiating monitoring of the credential throughout performance of the extended-duration task by updating a device-listening data store to associate the credential with an identifier corresponding to the requesting system;
    detecting, prior to receiving any indication that the extended-duration task is no longer being performed, an event indicating that the credential has been altered; and
    transmitting an alert to a destination associated with the requesting system.

17. The computer-program product as recited in claim 16, wherein the actions further include:
    receiving, from a user device, an event communication that includes a request to modify or cancel the credential or an indication that the credential has been modified or cancelled; and
    identifying the event communication as the event indicating that the credential has been altered.

18. The computer-program product as recited in claim 16, wherein the actions further include:
    querying, based on the credential, a second data store to identify a user device with which the credential is associated, the second data store associating each of a plurality of credentials with a single user device; and
    receiving, in response to the query of the second data store, an identifier of the user device, wherein detecting the event indicating that the credential has been altered includes detecting a communication from the user device corresponding to the credential.

19. The computer-program product as recited in claim 16, wherein:
    updating the device-listening data store further comprises associating a task identifier corresponding to the extended-duration task with the identifier corresponding to the requesting system.

20. The computer-program product as recited in claim 16, wherein the actions further include:
    monitoring for an indication that the extended-duration task has been completed; and
    upon detecting that the extended-duration task has been completed, updating the device-listening data store to remove the association of the credential with the identifier corresponding to the requesting system.

21. The computer-program product as recited in claim 16, wherein the task comprises an extended-duration task.

* * * * *